(12) United States Patent
Lin

(10) Patent No.: US 8,882,541 B2
(45) Date of Patent: Nov. 11, 2014

(54) SOCKET CONNECTOR, CAMERA MODULE AND TERMINAL DEVICE

(71) Applicant: Huawei Device Co., Ltd., Shenzhen (CN)

(72) Inventor: Yubo Lin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 83 days.

(21) Appl. No.: 13/728,748

(22) Filed: Dec. 27, 2012

(65) Prior Publication Data

US 2013/0115816 A1    May 9, 2013

Related U.S. Application Data

(63) Continuation of application No. PCT/CN2011/082822, filed on Nov. 24, 2011.

(30) Foreign Application Priority Data

Dec. 3, 2010 (CN) .......................... 2010 1 0573212

(51) Int. Cl.

| | |
|---|---|
| *H01R 13/648* | (2006.01) |
| *H01R 12/77* | (2011.01) |
| *H01R 12/70* | (2011.01) |
| *H01R 33/88* | (2006.01) |
| *H04N 5/225* | (2006.01) |
| *H01R 13/24* | (2006.01) |
| *H04M 1/02* | (2006.01) |

(52) U.S. Cl.
CPC ............ *H01R 12/77* (2013.01); *H01R 12/7076* (2013.01); *H01R 33/88* (2013.01); *H04N 5/2257* (2013.01); *H04N 5/2258* (2013.01); *H01R 13/24* (2013.01); *H04M 1/0264* (2013.01); *H04M 1/0274* (2013.01)
USPC .................................................. 439/607.31

(58) Field of Classification Search
USPC ............ 439/607.31, 71, 330–331, 73, 607.1, 439/607.27, 607.5, 76.1
See application file for complete search history.

(56) References Cited

U.S. PATENT DOCUMENTS

| 5,928,036 A | 7/1999 | Thrush | |
|---|---|---|---|
| 7,422,482 B2 * | 9/2008 | Wang | ....................... 439/607.01 |

(Continued)

FOREIGN PATENT DOCUMENTS

| CN | 2733637 Y | 10/2005 |
|---|---|---|
| CN | 1881714 A | 12/2006 |

(Continued)

OTHER PUBLICATIONS

International Search Report issued in corresponding PCT Patent Application No. PCT/CN2011/082822, mailed Mar. 1, 2012.

(Continued)

*Primary Examiner* — Jean F Duverne
(74) *Attorney, Agent, or Firm* — Brinks Gilson & Lione

(57) ABSTRACT

A socket connector, including: a side wall, a group of elastic pins and a group of pins, in which the side wall encloses a containing cavity, a first opening and a second opening are arranged at two ends of the containing cavity respectively, the elastic pins are arranged in the containing cavity; the elastic pins are fixed at the inner side of the side wall, the pins are fixed at the outer side of the side wall, and the group of elastic pins are electrically connected to the group of pins one to one; the first opening and the second opening each are capable of holding an electronic component matched with the socket connector. a camera module and a terminal device which adopt the foregoing socket connector are provided. The socket connector has two openings for mounting, so two electronic components may be inserted at the same time.

17 Claims, 2 Drawing Sheets

(56) References Cited

U.S. PATENT DOCUMENTS

| | | |
|---|---|---|
| 7,802,996 B2 * | 9/2010 | Kusaki et al. ............... 439/76.1 |
| 2002/0101041 A1 | 8/2002 | Kameyama |
| 2006/0246762 A1 | 11/2006 | Chen et al. |
| 2009/0035992 A1 | 2/2009 | Wu |
| 2009/0286410 A1 | 11/2009 | Asai |

FOREIGN PATENT DOCUMENTS

| | | |
|---|---|---|
| CN | 200972958 Y | 11/2007 |
| CN | 201038505 Y | 3/2008 |
| CN | 201112785 Y | 9/2008 |
| CN | 201150084 Y | 11/2008 |
| CN | 201259942 Y | 6/2009 |
| CN | 101577380 A | 11/2009 |
| CN | 101582545 A | 11/2009 |
| CN | 201403133 Y | 2/2010 |
| CN | 102157816 A | 8/2011 |
| EP | 1705875 A2 | 9/2006 |
| JP | 2007012574 A | 1/2007 |
| JP | 2007109409 A | 4/2007 |
| WO | WO 2010/039125 A1 | 4/2010 |

OTHER PUBLICATIONS

Written Opinion of the International Searching Authority issued in corresponding PCT Patent Application No. PCT/CN2011/082822, mailed Mar. 1, 2012.

Office Action issued in corresponding Chinese Patent Application No. 201010573212.0, mailed Apr. 3, 2013.

Office Action issued in corresponding Chinese Patent Application No. 201010573212.0, mailed Jun. 26, 2012.

Office Action issued in corresponding Chinese Patent Application No. 201010573212.0, mailed Dec. 27, 2012.

Extended European Search Report issued in corresponding European Patent Application No. 11845393.5, mailed Aug. 30, 2013, 7 pages.

* cited by examiner

SOCKET CONNECTOR, CAMERA MODULE AND TERMINAL DEVICE

CROSS-REFERENCE TO RELATED APPLICATIONS

This application is a continuation of International Application No. PCT/CN2011/082822, filed on Nov. 24, 2011, which claims priority to Chinese Patent Application No. 201010573212.0, filed on Dec. 3, 2010, both of which are hereby incorporated by reference in their entireties.

FIELD OF THE INVENTION

The present invention relates to the field of electronic technologies, and in particular, to a socket connector, a camera module and a terminal device.

BACKGROUND OF THE INVENTION

In a multimedia device such as a mobile phone, a notebook computer, and a video conference terminal, various connectors are inevitably used. For example, board to board connector (BTBC) and a flexible printed circuit board (FPCB) are two common types. However, a connection manner adopting a BTBC or an FPCB has technical defects such as large occupation volume and low connection reliability.

Therefore, a connection manner with a socket connector emerges. As shown in FIG. 1 and FIG. 2, for this Socket connector, an opening 740 used to contain an electronic component is usually opened at the front 710 of a housing 700, elastic pins 810 electrically connected to the electronic component is arranged at the bottom of the opening 740, locking apparatuses 820 used to buckle and fix the electronic component is arranged at the inner wall of a groove part, pins 830 connected to the elastic pins extend at the back 720 of the housing and these pins 830 are configured to solder and fix the Socket connector on a circuit board and implement an electrical connection between the pins 830 and the circuit board.

In the industry, the Socket connector is usually used as a connection manner of a camera, because the Socket connector may provide good electromagnetic shielding for a camera module, which is conducive to formation of standardization. At present, in a dual-camera mobile phone, main/auxiliary cameras are arranged at the front and back of a circuit board respectively. In a circuit design, the main/auxiliary cameras generally share a power supply, a clock, and a data bus; in a structure design, the main/auxiliary cameras generally each use two connectors to connect to the circuit board.

In a common design, the main camera and the auxiliary camera each adopt two connectors, such as each adopting an FPCB and a socket connector connected to a main board. When this connection manner is adopted, a data bus is arranged between the main camera and the auxiliary camera and occupies a certain wiring space of the main board, which is adverse to the design of the main board; besides, adopting two connectors at the same time is adverse to materials maintenance in production manufacturing and production cost is high.

In another design, an FPC connection manner is adopted, two cameras are crimped at two ends of the FPC respectively and the two cameras are connected to the main board through a BTBC connected to an FPCB. With this connection manner, the two cameras and the FPCB form an assembly. The defect of any material in the assembly may cause the whole assembly to be scrapped, so that it is difficult to control the reject ratio of manufactured products and the assembly cost becomes higher. Besides, the length of the FPCB is fixed, which imposes a limitation to the structure stack of a mobile phone, so the generality is bad, which is inapplicable to a mobile phone structure with multiple forms.

SUMMARY OF THE INVENTION

Embodiments of the present invention provide a socket connector, a camera module and a terminal device. The socket connector may be inserted by two electronic components at the same time.

A socket connector includes: a side wall, a group of elastic pins and a group of pins; the side wall encloses a containing cavity, a first opening and a second opening are arranged at two ends of the containing cavity respectively, the elastic pins are arranged in the containing cavity; the elastic pins are fixed at the inner side of the side wall, the pins are fixed at the outer side of the side wall, the group of elastic pins are electrically connected to the group of pins one to one; the first opening and the second opening each are capable of holding an electronic component matched with the socket connector.

A camera module includes a main camera and an auxiliary camera, and further includes the foregoing socket connector; the socket connector is fixed on a circuit board, the main camera and the auxiliary camera are inserted in the first opening and the second opening of the socket connector respectively.

A terminal device includes: a case, a circuit board and a processor; and further includes the foregoing socket connector, a first electronic component mounted in the first opening and a second electronic component mounted in the second opening; the circuit board is placed in a space enclosed by the case, and the processor is fixedly arranged on the circuit board; a first through hole is opened on the circuit board, the socket connector is placed in the first through hole, the socket connector is fixed relative to the circuit board, the pins are electrically connected to the processor, the elastic pins are electrically connected to the first electronic component and the second electronic component, and the processor performs data interaction with the first electronic component and the second electronic component through the pins and the elastic pins.

For the socket connector in the embodiment of the present invention, on the basis of the socket connector which has only an opening for mounting and can only be connected to an electronic component in the prior art, another opening for mounting is opened at a side opposite to the opening through extension, thereby forming the socket connector having two openings for mounting. With the socket connector in the embodiment of the present invention, two electronic components such as two cameras may be inserted at the same time, so that a data bus between the two cameras may be canceled; further, a manufacturing process may be simplified, the generality may be increased and the production cost may be reduced.

BRIEF DESCRIPTION OF THE DRAWINGS

To illustrate the technical solutions in the embodiments of the present invention or in the prior art more clearly, the following briefly describes the accompanying drawings needed for describing the embodiments or the prior art. Apparently, the accompanying drawings in the following description show some embodiments of the present invention, and persons skilled in the art may derive other drawings from these accompanying drawings without creative efforts.

DETAILED DESCRIPTION OF THE EMBODIMENTS

An embodiment of the present invention provides a socket connector, and on the basis of the socket connector which only has an opening for mounting and can only be connected to an electronic component in the prior art, another opening for mounting is opened at a side opposite to the opening through extension, thereby forming a technical solution of the socket connector having two openings for mounting. The embodiment of the present invention further provides a camera module and a terminal device correspondingly. The embodiments of the present invention are described in detail below.

Figure 1:
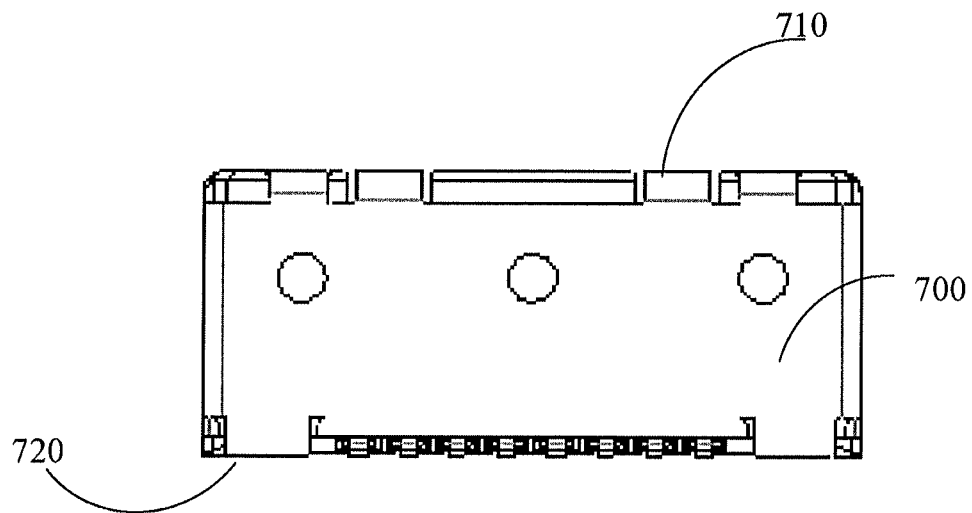
FIG. 1 is a front view of a Socket connector in the prior art.
Figure 2:
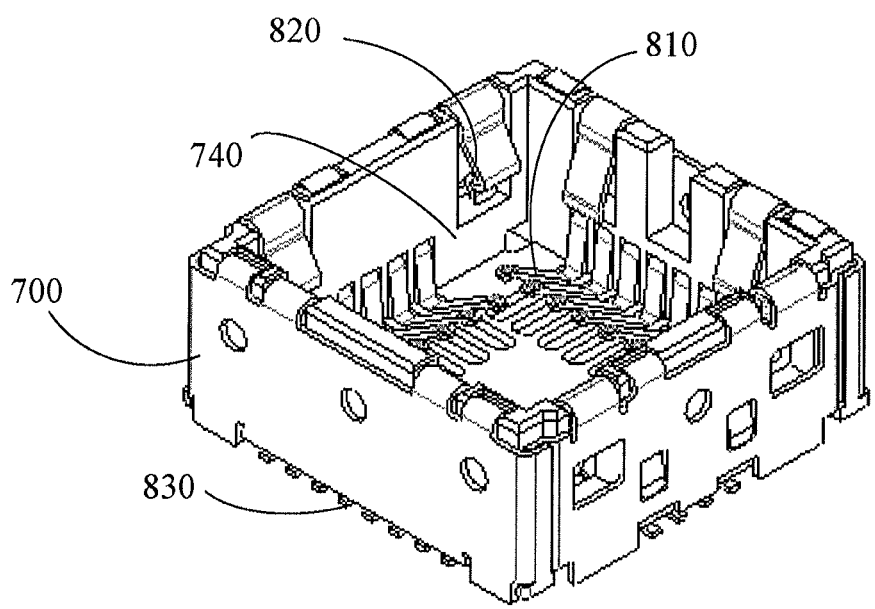
FIG. 2 is a stereogram of the Socket connector in the prior art.
Figure 3:
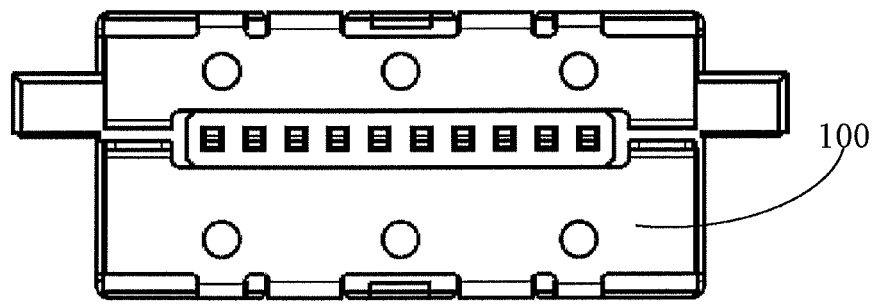
FIG. 3 is a front view of a Socket connector according to an embodiment of the present invention.
Figure 4:
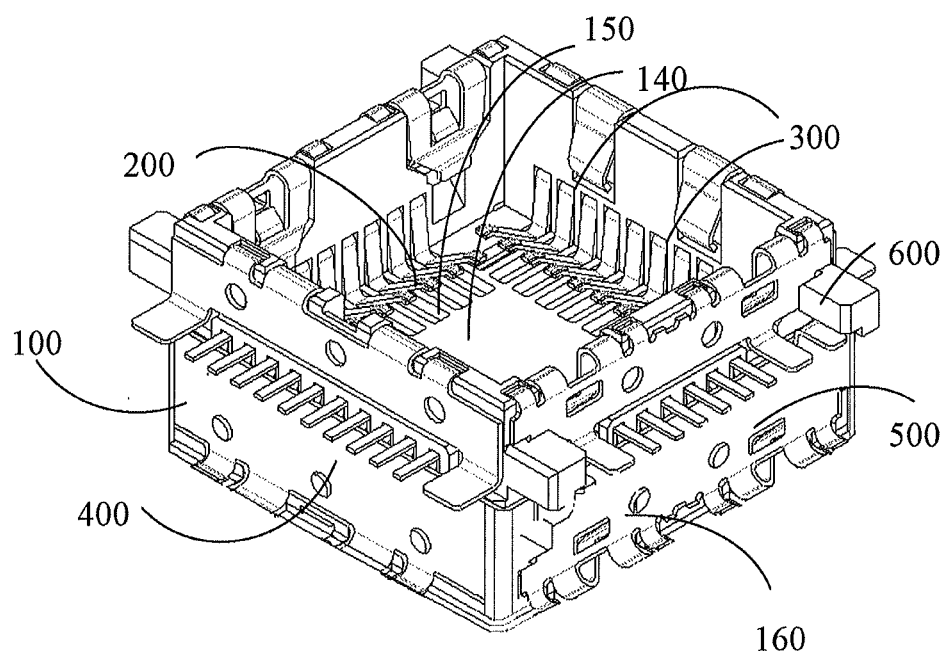
FIG. 4 is a stereogram of the Socket connector according to the embodiment of the present invention.

Referring to FIG. 3 and FIG. 4, the embodiment of the present invention provides a socket connector, including: a side wall 100, a group of elastic pins 200 and a group of pins 400; the side wall 100 encloses a containing cavity 140, a first opening and a second opening are arranged at two ends of the containing cavity 140 respectively, the elastic pins 200 are arranged in the containing cavity, in which the elastic pins 200 are fixed at the inner side of the side wall 100, the pins 400 are fixed at the outer side of the side wall 100, the group of elastic pins 200 are electrically connected to the group of pins 400 one to one; the first opening and the second opening each are capable of holding an electronic component matched with the socket connector.

The socket connector in the embodiment of the present invention has two openings for containing and mounting electronic components, which may be inserted by two electronic components at the same time; and a dip type design reduces the height of the socket connector, which is conducive to implementing the ultrathin design of an electronic apparatus. For example, when the dip type socket connector of the embodiment of the present invention is adopted in a mobile phone including two cameras, the two cameras may be connected directly, so that a data bus between the two cameras in the prior art is canceled; therefore, the manufacturing process may be simplified, the generality may be increased and the production cost may be reduced.

Embodiment 1

In this embodiment, to fixedly accept an electronic component such as a camera more firmly in two openings of a containing cavity 140, several elastic locking apparatuses 300 configured to fix the electronic component may be arranged at the inner side of a side wall 100. The elastic locking apparatus 300 adapts to a card slot arranged in the electronic component such as a camera, so that the camera may be fixedly accepted in the opening. The elastic locking apparatus 300 may be an elastic metal sheet. One end of the elastic metal sheet is fixed on the side wall 100, the other end is processed by bending so as to form a fastening part at a bending position, and the fastening part adapts to the card slot arranged in the electronic component to fix the electronic component. Definitely, the elastic locking apparatus 300 may also adopt structures of any conventional technical means, such as adopting an elastic locking structure including a spring, or a locking structure made of an elastic material.

Embodiment 2

In this embodiment, to protect an electronic component inserted in a dip type socket connector from electromagnetic disturbance, an electromagnetic shielding design may be performed and a side wall 100 may be made of a conductive material, such as made of a metal material, and a layer of insulating material such as a plastic film covers merely a position where insulation is needed, such as a position where an elastic pin 200 is arranged. Definitely, other schemes may also be adopted, such as a metal shielding layer 500 may be covered at the outer side of the side wall 100 to perform electromagnetic shielding on the electronic component. The metal shielding layer 500 may be a metal board, and the metal board and an elastic locking apparatus 300 may adopt an integrated structure. In this way, the integrated structure is directly sleeved onto the side wall 100, so that the fixing and electrical shielding are implemented on the electronic component at the same time. The metal shielding layer may be further connected to a grounded end of a circuit board, as so to avoid generation of static electricity which causes damage to the electronic component.

Embodiment 3

A socket connector of an embodiment of the present invention adopts a dip type design, namely, a circuit board is opened with a first through hole matched with the shape of a dip type socket connector. A part of the dip type socket connector passes through the through hole and is located at a design position by using a group of pins 400 arranged at the outer side of a side wall 100, and the socket connector is fixed on the circuit board by fixing such as soldering the pins 400 on the circuit board. To further increase the firmness degree of the socket connector fixed on the circuit board, a fixed bump 600 may be arranged at the outer side of the side wall 100 and the fixed bump 600 cooperates with the circuit board and fixes the socket connector on the circuit board, in which, the cooperation may be performed by means of soldering, riveting, buckling, embedding or bolting. Optionally, the fixed bump may be made of a conductive material, one end of the fixed bump is connected to a metal shielding layer, and the other end is connected to a grounded end of the circuit board. In this way, generation of static electricity which causes damage to an electronic component may be avoided.

Embodiment 4

In this embodiment, a group of elastic pins 200 of the socket connector include N pieces of elastic pins 200 and a group of pins 400 include N pieces of pins 400, in which, N is a positive integer. In a preferable manner, each elastic pin 200 includes two electrically connected sub-pins, and the two electrically connected sub-pins may be electrically connected to an electronic component held by a first opening and an electronic component held by a second opening respectively; in another preferable manner, each elastic pin 200 includes two electrical contact surfaces, and the two electrical contact surfaces may be electrically connected to the electronic component held by the first opening and the electronic component held by the second opening respectively.

Preferably, each pin 400 and the elastic pin 200 connected to the pin 400 may be an integrated structure. Accordingly, N pieces of second through holes are opened on a side wall 100, the pin 400 and the elastic pin 200 which are integrally formed are threaded through the second through hole, the pin 400 extends from the outer side of the side wall 100 and the elastic pin 200 extends from the inner side of the side wall 100. In an implementation manner, a long and thin metal sheet or metal wire may be adopted to be bent to form the pin 400 and the elastic pin 200 which are integrally formed. One end of the long and thin metal sheet or metal wire is located at the inner side of the side wall 100 and used as the elastic pin 200, the other end is located at the outer side of the side wall 100 and used as the pin 400, and the middle part is fixed in the side wall 100.

Preferably, the socket connector may further include a blocking board; the blocking board is arranged in a containing cavity 140, and is vertical to the side wall 100; the blocking board is fixed to the side wall 100, or the blocking board and the side wall 100 are an integrated structure; a third through hole 150 is opened in the position of the blocking board corresponding to each elastic pin 200, and the elastic pin 200 is placed in the third through hole 150, so that two electrically connected sub-pins or the two electrical contact surfaces protrudes from two faces of the blocking board respectively, so as to contact pins of the electronic components held at the two openings respectively.

Preferably, the elastic pin 200 is located at the middle part of the inner side of the side wall 100, and the pin 400 is located at the middle part of the outer side of the side wall 100; the middle part includes a part between two positions, a position of ¼ of the side wall extending from the first opening to the second opening, and a position of ¼ of the side wall extending from the second opening to the first opening. Optionally, the blocking board is also located at the middle part of the inner side of the side wall 100.

Here, it should be noted that, based on the reason that the first opening and the second opening are in opposite directions and share a group of elastic pins 200, pins of the two electronic components needs to be symmetrically distributed in a mirror image.

When the dip type socket connector is used to connect with a camera, the elastic pin 200 (including the pin 400 connected with the elastic pin 200 or being an integrated structure with the elastic pin 200) includes a control pin of a data bus, a clock (clock), a power supply, and cameras at two ends, while arrangement and distribution of pins of the cameras at the two ends needs to be designed in a mirror image, and pins of the cameras include control pins of a data bus, a clock, a power supply, and a camera at a single end, thereby assuring an electrical connection.

Embodiment 5

In this embodiment, when made of a metal material, a side wall 100 of a dip type socket connector may be formed through one-time punching, thereby forming an integrated punch forming structure. To increase the intensity, lower the weight and balance the pressure, the side wall 100 may be opened with multiple round holes 160. Definitely, the side wall 100 may also be formed through injection molding in an injection molding machine by using a plastic material. A shape of the cross section of the side wall 100 is determined by the cross section of an inserted electronic component, such as a rectangle or a circle matched with the shape of the cross section of a camera, or an ellipse, a triangle, a regular polygon, an irregular polygon, and any geometrical shape enclosed by closed curves in a plane.

Embodiment 6

This embodiment provides a camera module, including the foregoing socket connector, a main camera and an auxiliary camera, in which the socket connector is fixed on a circuit board, and the main camera and the auxiliary camera are inserted in a first opening and a second opening of the socket connector respectively. The two cameras are fixed on the circuit board through the socket connector and implement electrical connection with the circuit board. Based on the reason that the first opening and the second opening of the socket connector are in opposite directions and share a group of elastic pins 200, pins of the main camera and the auxiliary camera, which contact the elastic pins 200, need to be symmetrically distributed in a mirror image. The camera module provided by this embodiment uses a connector (socket) to implement connection of the two cameras, thereby minimizing circuit board wiring between double cameras, and at the same time, avoiding mutual influence of the manufacturing process yield of the two cameras in the manufacturing process.

Embodiment 7

This embodiment provides a terminal device, including: a case, a circuit board, a processor, and a socket connector described from Embodiment 1 to Embodiment 6, a first electronic component mounted in a first opening of the socket connector and a second electronic component mounted in a second opening.

The circuit board is placed in a space enclosed by the case, the processor is fixedly arranged on the circuit board; the circuit board is opened with a first through hole, the socket connector is placed in the first through hole, the socket connector is fixed relative to the circuit board, a pin of the socket connector is electrically connected to the processor, the elastic pin is electrically connected to the first electronic component and the second electronic component and the processor performs data interaction with the first electronic component and the second electronic component through the pin and the elastic pin.

The foregoing terminal device may be a mobile phone, a man-machine interaction terminal, an electronic book or other terminal devices having a display function. In the case that the terminal device is a mobile phone, the first electronic component is a first camera, and the second electronic component is a second camera; the mobile phone further includes: a radio frequency circuit, an audio circuit, and a power supply circuit, so that basic functions of the mobile phone may be accomplished. The radio frequency circuit, the audio circuit, and the power supply circuit are separately introduced below.

The radio frequency circuit is configured to set up communication between the mobile phone and a wireless network and implement receiving and sending of data between the mobile phone and the wireless network.

The audio circuit is mainly configured to capture sounds and convert the captured sounds into sound data, so that the mobile phone sends the sound data to the wireless network through the radio frequency circuit, or restore the sound data, which is received from the wireless network by the mobile phone through the radio frequency circuit, to a sound and play the sound to a user; or the audio circuit has the foregoing functions of capturing and sending sound data, as well as receiving and playing the sound data at the same time; the audio circuit includes a microphone and a loudspeaker, in which:

the microphone is configured to capture sounds and convert the captured sounds into sound data, so that the mobile phone sends the sound data to the wireless network through the radio frequency circuit; and the loudspeaker is configured to restore the sound data, which is received by the mobile phone from the wireless network through the radio frequency circuit, to a sound and play the sound to the user.

The power supply circuit is configured to supply power for each circuit or component of the mobile phone to assure normal work of the mobile phone.

A first camera hole is opened on one surface of the case, and the first camera is placed in the first camera hole; a second camera hole is opened on another surface of the case, and the second camera is placed in the second camera hole; the one surface of the case and the another surface of the case are opposite surfaces.

For the terminal device in this embodiment which adopts the socket connector of the embodiments of the present invention, a first electronic component and a second electronic component of the terminal device are mounted in the first opening and the second opening of the socket connector respectively, so that connection of a data bus is not required between the first electronic component and the second electronic component, and such advantages as high reliability and simple manufacturing process are provided.

To sum up, the embodiments of the present invention provide a socket connector, a camera module and a terminal device. For the socket connector, which is improved on the basis that a socket connector in the prior art only has an opening for mounting and can only be connected to an electronic component, another opening for mounting is opened at the back of the existing socket connector through extension, thereby forming a socket connector having two openings for mounting and containing. Therefore, when the dip type socket connector of the embodiments of the present invention is adopted, two electronic components such as two cameras may be inserted at the same time, so that the data bus between the two cameras may be canceled; further, the manufacturing process may be simplified and the generality may be increased; besides, the dip type design reduces the height of the socket connector, which is conducive to implementing the ultrathin design of an electronic apparatus.

A dip type socket connector, a camera module and a terminal device provided in the embodiments of the present invention are introduced in detail above. Specific embodiments are used for illustrating principles and implementation manners of the present invention. The above descriptions of the embodiments are merely for understanding the method and core ideas of the present invention. At the same time, persons skilled in the art may make modifications to the specific implementation manners and application ranges according to the idea of the present invention. In conclusion, the content of the specification shall not be regarded as a limitation to the present invention.

What is claimed is:

1. A socket connector, comprising:
a side wall, a group of elastic pins and a group of pins, wherein
the side wall encloses a containing cavity, a first opening and a second opening are arranged at two ends of the containing cavity respectively, and the elastic pins are arranged in the containing cavity;
the elastic pins are fixed at the inner side of the side wall, the pins are fixed at the outer side of the side wall, and the group of elastic pins are electrically connected to the group of pins one to one; and
the first opening and the second opening each are capable of holding an electronic component matched with the socket connector.

2. The socket connector according to claim 1, wherein the side wall is arranged with one or more elastic locking apparatuses for fixing the electronic component.

3. The socket connector according to claim 2, wherein the elastic locking apparatus is an elastic metal sheet of which one end is fixed on the side wall, the other end of the elastic metal sheet has a fastening part for fixing the electronic component and the fastening part adapts to cooperate with a slot arranged on the electronic component.

4. The socket connector according to claim 2, wherein a metal shielding layer covers the outer side of the side wall and the metal shielding layer performs electromagnetic shielding on the electronic component.

5. The socket connector according to claim 4, wherein the metal shielding layer and the elastic locking apparatus are an integrated structure.

6. The socket connector according to claim 4, wherein a fixed bump is arranged at the outer side of the side wall and the fixed bump is configured to cooperate with a circuit board and to fix the socket connector on the circuit board.

7. The socket connector according to claim 6, wherein the fixed bump is made of a conductive material, one end of the fixed bump is connected to the metal shielding layer and the other end of the fixed bump is connected to a grounded end of the circuit board.

8. The socket connector according to claim 1, wherein the group of elastic pins include N pieces of elastic pins, and the group of pins include N pieces of pins, N being a positive integer,
wherein each of the elastic pins comprises two electrically connected sub-pins, the two electrically connected sub-pins are able to be electrically connected to the electronic component held by the first opening and the electronic component held by the second opening respectively; or, each of the elastic pins comprises two electrical contact surfaces, and the two electrical contact surfaces are able to be electrically connected to the electronic component held by the first opening and the electronic component held by the second opening respectively.

9. The socket connector according to claim 8, wherein each of the pins connected to the pins are an integrated structure;
the side wall is opened with N pieces of second through holes, the pin and the elastic pin which are integrally formed are threaded through the second through hole, the pin extends from the outer side of the side wall and the elastic pin extends from the inner side of the side wall.

10. The socket connector according to claim 8, further comprising: a blocking board, wherein
the blocking board is arranged in the containing cavity and is vertical to the side wall; the blocking board is fixed to the side wall, or the blocking board and the side wall are an integrated structure; and
a position corresponding to each elastic pin on the blocking board is opened with a third through hole, the elastic pin is placed in the third through hole (150), and the two electrically connected sub-pins or the two electrical contact surfaces protrude from two faces of the blocking board respectively.

11. The socket connector according to claim 1, wherein the side wall is an integrated punch forming structure, and the side wall is opened with a round hole; a cross section of the side wall is a rectangle or a circle.

12. The socket connector according to claim 1, wherein
the elastic pin is located at the middle part of the inner side of the side wall and the pin is located at the middle part of the outer side of the side wall; and
the middle part comprises: a part between two positions, a position of ¼ of the side wall extending from the first opening to the second opening, a position of ¼ of the side wall extending from the second opening to first opening.

13. A camera module, comprising a main camera and an auxiliary camera, and further comprising a socket connector which comprising,
a side wall, a group of elastic pins and a group of pins wherein
the side wall encloses a containing cavity, a first opening and a second opening are arranged at two ends of the containing cavity respectively, and the elastic pins are arranged in the containing cavity;
the elastic pins are fixed at the inner side of the side wall, the pins are fixed at the outer side of the side wall, and the group of elastic pins are electrically connected to the group of pins one to one; and
the first opening and the second opening each are capable of holding an electronic component matched with the socket connector;
wherein the socket connector is fixed on a circuit board, the main camera and the auxiliary camera are inserted in a first opening and a second opening of the socket connector respectively.

14. The mobile phone camera module according to claim 13, wherein pins of the main camera and the auxiliary camera are symmetrically distributed in a mirror image.

15. A terminal device, comprising: a case, a circuit board, a processor; and further comprising a socket connector which comprising,
a side wall, a group of elastic pins and a group of pins, wherein
the side wall encloses a containing cavity, a first opening and a second opening are arranged at two ends of the containing cavity respectively, and the elastic pins are arranged in the containing cavity;
the elastic pins are fixed at the inner side of the side wall, the pins are fixed at the outer side of the side wall, and the group of elastic pins are electrically connected to the group of pins one to one; and
the first opening and the second opening each are capable of holding an electronic component matched with the socket connector;
wherein the terminal device further comprises a first electronic component mounted in the first opening and a second electronic component mounted in the second opening, and the circuit board is placed in a space enclosed by the case, and the processor is fixedly arranged on the circuit board; the circuit board is opened with a first through hole, the socket connector is placed in the first through hole, the socket connector is fixed relative to the circuit board, the pin is electrically connected to the processor, the elastic pin is electrically connected to the first electronic component and the second electronic component, and the processor performs data interaction with the first electronic component and the second electronic component through the pin and the elastic pin.

16. The terminal device according to claim 15, wherein the terminal device is a mobile phone; the first electronic component is a first camera and the second electronic component is a second camera, wherein:
the mobile phone further comprises: a radio frequency circuit, a microphone, a loudspeaker and a power supply circuit, wherein
the radio frequency circuit is configured to set up communication between the mobile phone and a wireless network and implement receiving and sending of data between the mobile phone and the wireless network;
the microphone is configured to capture sounds and convert the captured sounds into sound data so that the mobile phone sends the sound data to the wireless network through the radio frequency circuit;
the loudspeaker is configured to restore sounds from sound data received by the mobile phone from the wireless network through the radio frequency circuit and play the sounds to a user; and
the power supply circuit is configured to supply power for each circuit or component of the mobile phone; and
one surface of the case is opened with a first camera hole, and the first camera is placed in the first camera hole; another surface of the case is opened with a second camera hole, and the second camera is placed in the second camera hole; one surface of the case and another surface of the case are opposite surfaces.

17. A socket connector for receiving a camera, comprising:
a side wall, a group of elastic pins and a group of pins, wherein
the side wall encloses a containing cavity, a first opening and a second opening are arranged at two ends of the containing cavity respectively, and the elastic pins are arranged in the containing cavity;
the elastic pins are fixed at the inner side of the side wall, the pins are fixed at the outer side of the side wall, and the group of elastic pins are electrically connected to the group of pins one to one; and
the first opening is configured to receive a first camera, and the second opening is configured to receive a second camera.

* * * * *

UNITED STATES PATENT AND TRADEMARK OFFICE
CERTIFICATE OF CORRECTION

PATENT NO.        : 8,882,541 B2                          Page 1 of 1
APPLICATION NO.   : 13/728748
DATED             : November 11, 2014
INVENTOR(S)       : Yubo Lin It is certified that error appears in the above-identified patent and that said Letters Patent is hereby corrected as shown below:

In the Claims

In column 8, claim 9, line 44, after "of the" insert --pins and the elastic--.

Signed and Sealed this
Twenty-fourth Day of March, 2015

Michelle K. Lee
*Director of the United States Patent and Trademark Office*